(12) United States Patent
Yi et al.

(10) Patent No.: US 7,190,701 B2
(45) Date of Patent: Mar. 13, 2007

(54) WIRELESS COMMUNICATION SYSTEM AND METHOD HAVING RLC LAYER OF TRANSPARENT MODE

(75) Inventors: Seung-June Yi, Seoul (KR); Jin-Young Park, Gunpo-shi (KR)

(73) Assignee: LG Electronics Inc., Seoul (KR)

( * ) Notice: Subject to any disclaimer, the term of this patent is extended or adjusted under 35 U.S.C. 154(b) by 800 days.

(21) Appl. No.: 09/993,520

(22) Filed: Nov. 27, 2001

(65) Prior Publication Data

US 2002/0065093 A1 May 30, 2002

(30) Foreign Application Priority Data

Nov. 30, 2000 (KR) ............... 2000-72156

(51) Int. Cl.
*H04J 3/16* (2006.01)
(52) U.S. Cl. ..................... 370/469; 370/474
(58) Field of Classification Search ............ 370/469, 370/474
See application file for complete search history.

(56) References Cited

U.S. PATENT DOCUMENTS

| 5,751,454 | A * | 5/1998 | MacDonald et al. ......... 398/59 |
| 5,936,965 | A * | 8/1999 | Doshi et al. ................ 370/469 |
| 6,201,813 | B1 * | 3/2001 | Klausmeier et al. ........ 370/412 |
| 6,317,430 | B1 | 11/2001 | Knisely et al. |
| 6,408,009 | B1 * | 6/2002 | Campbell et al. ........... 370/461 |
| 6,567,416 | B1 * | 5/2003 | Chuah ........................ 370/418 |
| 6,625,133 | B1 * | 9/2003 | Balachandran et al. ..... 370/329 |
| 6,788,686 | B1 * | 9/2004 | Khotimsky et al. ......... 370/394 |
| 6,798,785 | B1 * | 9/2004 | Sasson et al. ............... 370/466 |
| 2001/0043576 | A1 * | 11/2001 | Terry ......................... 370/328 |

FOREIGN PATENT DOCUMENTS

| EP | 1 285 512 A2 | 2/2003 |
| JP | 2003-032088 | 1/2000 |
| WO | WO 01/78323 A2 | 10/2001 |

OTHER PUBLICATIONS

Charlton, Steve, "3GPP RLC Radio Link Control—Transparent Mod-Segmentation/Concatenation," May 10, 2000, contribution material.
"Universal Mobile Telecommunications System RLC Protocol Specification" (3G TS 25, 322 version 3.1.2 Release 1999) ESTI TS 125 322 V3.1.2 (Jan. 2000).

(Continued)

*Primary Examiner*—Hassan Kizou
*Assistant Examiner*—Anthony Sol
(74) *Attorney, Agent, or Firm*—Fleshner & Kim, LLP

(57) ABSTRACT

A wireless communication system is disclosed having an RLC layer of a transparent mode and data processing method in the same. The present invention provides a way to store service data units transferred from a higher layer in a transmission data storage module, receive information about a prescribed size and number of protocol data unit(s) from a lower layer, turn the respective service data units into at least one protocol data unit in accordance with the received information about the prescribed size and number, and transmit the at least one protocol data unit to the lower layer in every transmission time interval.

24 Claims, 3 Drawing Sheets

OTHER PUBLICATIONS

TSGR2#12(00)867, "Transmission of the fixed size PDUs through the Transparent RLC", TSG RAN WG 2#12, Seoul, Korea, Apr. 10-13, 2000.

GPP TSG RAN WG2 Meeting #yy, "Change Request", Document R2-00xxxx.

3GPP_TSG_RAN_WG2 Archives—Apr. 2000 (#93).

3GPP_TSG_RAN_WG2 Archives—May. 2000 (#16).

JP office action dated Nov. 12, 2004.

* cited by examiner

WIRELESS COMMUNICATION SYSTEM AND METHOD HAVING RLC LAYER OF TRANSPARENT MODE

BACKGROUND OF THE INVENTION

1. Field of the Invention

The present invention relates to a wireless communication system having an RLC layer of a transparent mode and data processing method in the same.

2. Background of the Related Art

Many efforts are made to research and develop communication technologies providing access to multimedia without spatiotemporal limitations. The development of these technologies in addition to the development of digital data processing and transmission technologies will help unify wireless and wired communications and help realize a real-time global data communication system. Developments in digital data processing and data transmission increasingly enable users to access to information, through still images stored on a network, the real-time transmission of moving pictures, wired/wireless communication, and conventional voice communication. And, IMT-2000 will be included in such access technologies.

A Radio Link Control (RLC) layer is a second layer of 3GPP and corresponds to a second layer of an OSI 7-layered model, as a protocol layer controlling a data link. Species of RLC entities used for 3GPP are mainly divided into a transparent (Tr) mode having no RLC header and a non-transparent (Ntr) mode.

The Ntr mode is further divided into an unacknowledged mode (UM mode), having no acknowledged (ACK) signal from the receiver side, and an acknowledged mode (AM) having an acknowledged signal from the receiver side. Therefore, the modes of RLC which are presently used are Tr, UM, and AM.

FIG. 1 illustrates a diagram of a data transmission apparatus in a wireless communication system having an RLC layer of a Tr mode. A Tr mode not attached to an RLC header is simpler than an entity structure in an NTr mode.

Based on a radio interface 100, a data transmission apparatus having an RLC layer 101 of a Tr mode carries out segmentation through a segmentation part 102 so as to turn service data units (SDUs), which come down from a higher layer, into protocol data units (PDUs) having a uniform size.

The segmented protocol data units are stored in a transmission buffer 103 and then sent down to a medium access control (MAC) layer 104 through a logical channel. When the RLC layer 101 transmits the PDUs to the MAC layer 104, the PDUs are transmitted by transmission time interval (TTI).

The RLC layer 101 transmits the number of PDUs requested by the MAC layer 104. For this purpose, the MAC layer 104 informs the RLC layer 101 of the number of PDUs to send during each TTI, through its status information (MAC-STATUS-IND primitive).

In response to the information about the number of PDUs to send with each TTI, the RLC layer 101 transmits the number of PDUs corresponding to the number requested by the MAC layer 104. These PDUs are transmitted from the transmission buffer 103 to the MAC layer 104.

The PDUs are transmitted to a data receiver device 105 of a wireless communication system having the RLC layer of the Tr mode based on the radio interface 100. The receiver device 105 stores the PDUs received on the basis of the radio interface 100 in a receiver buffer 106 for a while. The receiver device 105 then sends up the PDUs by SDU unit to a higher layer, whenever PDUs constructing a complete SDU are received. Namely, the protocol data units are reassembled by SDU unit in an assembly part 107 so as to be delivered to the higher layer.

The above-mentioned related art has the problems or disadvantages as follows.

First, the MAC layer 104 of the transmission device multiplexes the PDUs received from various RLC layers and then transmits the multiplexed PDUs to a physical layer PHY through a transport channel. In this case, in order to improve an efficiency of transmission, the MAC layer 104 adjusts the number of the PDUs received from each of the RLC layers differently with each TTI.

However, it is difficult to secure the transmission efficiency improvement by means of adjusting only the number of PDUs with every TTI. In order to improve the transmission efficiency, it is desirable that a PDU size as well as the number of PDUs received from the respective RLC layers, with every TTI, be adjusted. Yet, it is very difficult to adjust the PDU size with every TTI in the related art.

Second, the data transmission device of the related art carries out segmentation on the SDUs based on PDUs of a uniform size and then stores the PDUs in the transmission buffer 103. If a PDU having a different size is to be transmitted, the PDUs stored in the transmission buffer 103 have to be reassembled into SDUs again.

Successively, the reassembled SDUs are segmented into new PDUs having the size requested by the MAC layer 104. Then, the re-segmented PDUs are transmitted to the MAC layer 104.

For the above-mentioned case, a process or means for reassembling the PDUs, stored in the transmission buffer 103, into SDUs is required. Moreover, a process of segmenting the reassembled SDUs into PDUs having the size requested by the MAC layer 104 is required as well. Therefore, the construction of the RLC layer becomes complicated and a transmission processing time of the protocol data units is increased.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a wireless communication system that processes protocol data units by varying the size and number of the protocol data units.

Another object of the present invention is to provide a method of processing protocol data units in a wireless communication system.

To achieve these objects and other advantages and in accordance with the purpose of the invention, as embodied and broadly described herein, a wireless communication system having a radio link control layer of a transparent mode according to the present invention includes a transmission data storage module storing a service data unit transferred from a higher layer and receiving information about a demanded size and number of protocol data unit(s) from a lower layer and a segmentation module depending on the information from the lower layer. The segmentation module segments the service data unit into at least one protocol data unit having the demanded size and number.

Also, the segmentation module transfers the at least one protocol data unit to the lower layer.

In another aspect of the present invention, a data processing method in a wireless communication system having an RLC layer of a transparent mode includes storing service data units transferred from a higher layer in a transmission data storage module, receiving information about a demanded size and number of protocol data unit(s) from a lower layer, turning the respective service data units into at least one protocol data unit in accordance with the received information about the demanded size and number, and transmitting the at least one protocol data unit to the lower layer in every transmission time interval (TTI).

The objects of the present invention may be achieved in whole or in part by a data processing method that stores data received from a higher protocol layer into a buffer in the form of service data units (SDUs); retrieves the data from the buffer in the form of SDUs and conveys the SDUs to a segmenter; and segments the conveyed SDUs into a number of protocol data units (PDUs) with the segmenter, based on a selected type of transport channel.

The objects of the present invention may be achieved in whole or in part by a data processing method that stores data received from a lower protocol layer into a buffer in the form of protocol data units (PDUs); retrieves the data from the buffer in the form of PDUs and conveys the PDUs to a reassembler; and reassembles the conveyed PDUs into a service data unit (SDU) with the segmenter, based on a selected type of transport channel.

The objects of the present invention may be achieved in whole or in part by a data processing apparatus that includes a buffer that stores data received from a higher protocol layer in the form of service data units (SDUs) and a segmenter that retrieves the data from the buffer in the form of SDUs and segments the retrieved SDUs into a number of protocol data units (PDUs), based on a selected type of transport channel.

The objects of the present invention may be achieved in whole or in part by a data processing apparatus that includes a buffer that stores data received from a lower protocol layer in the form of protocol data units (PDUs) and a reassembler that retrieves the data from the buffer in the form of PDUs and reassembles the retrieved PDUs into a service data unit (SDU), based on a selected type of transport channel.

Preferably, the radio link control layer operates as the transparent mode.

Preferably, the data are processed by a unit of the service data unit in the transmission data storage module. Moreover, the service data unit which is not segmented is stored in the transmission data storage unit.

Preferably, when the protocol data unit for the radio link control layer is transmitted to the MAC layer, the number and size of the protocol data unit may vary in each of the transmission time intervals (TTI).

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
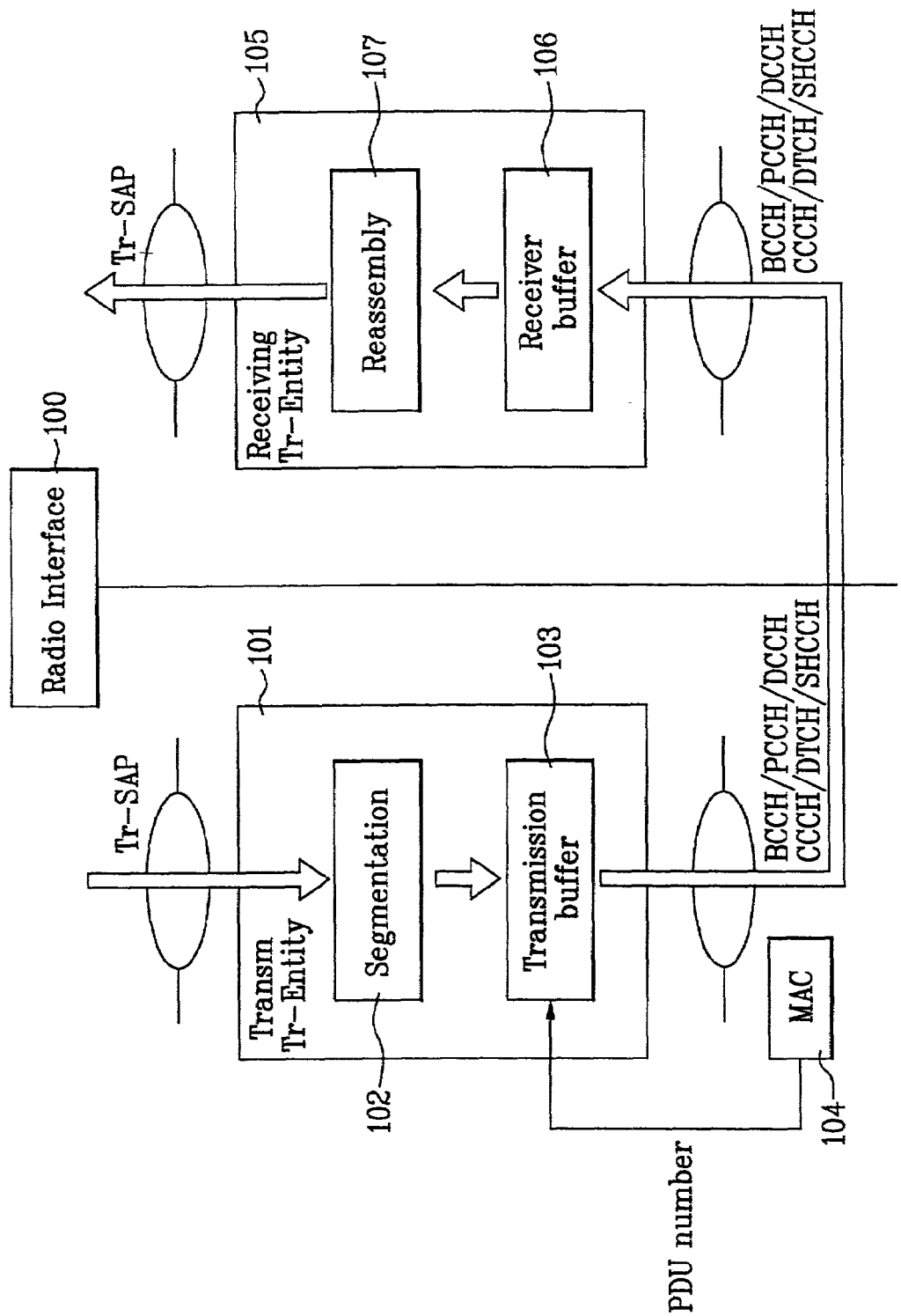
FIG. 1 illustrates a diagram of a data transmission apparatus in a wireless communication system having an RLC layer of a Tr mode, according to a related art.
Figure 2:
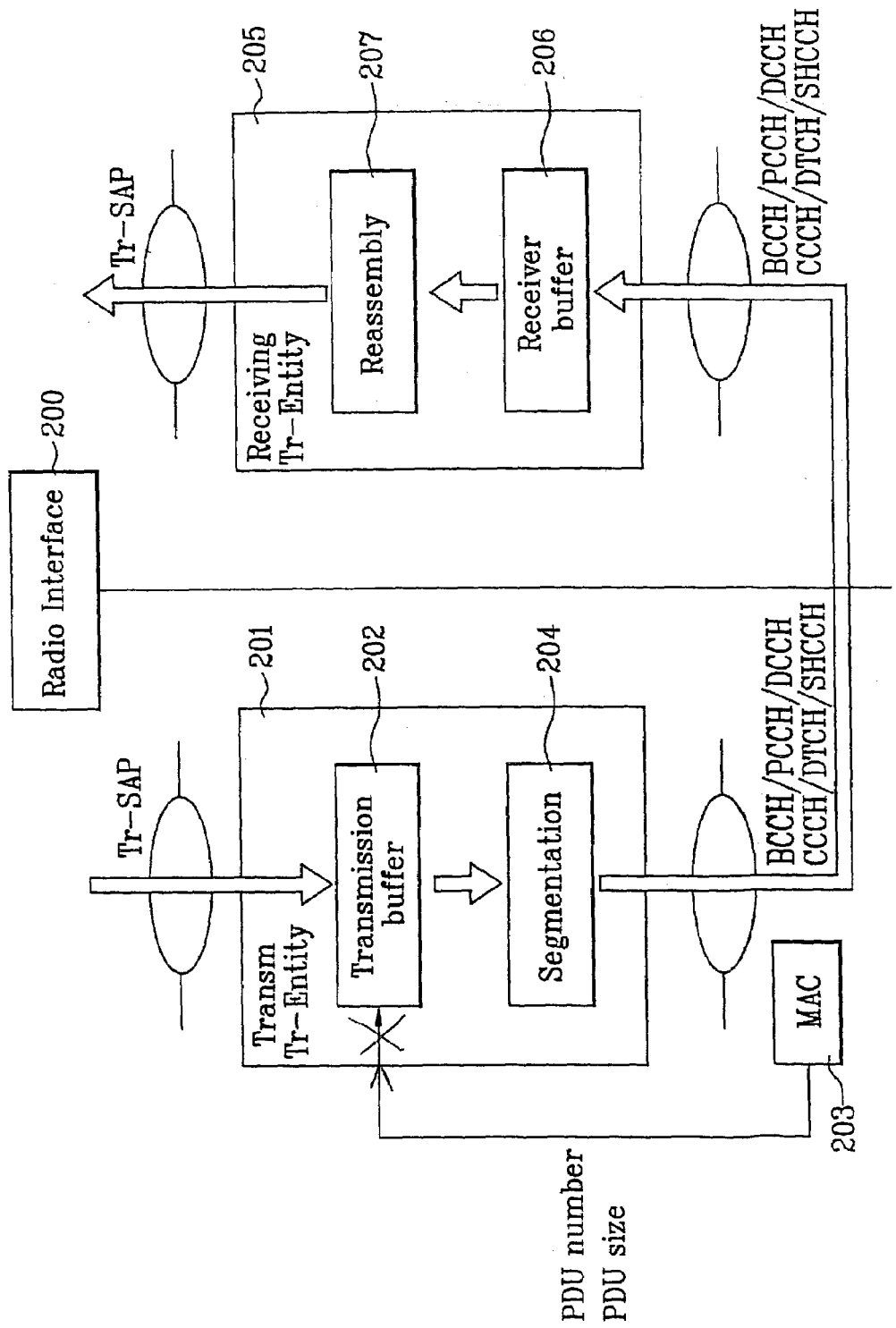
FIG. 2 illustrates a diagram of an RLC Tr entity structure according to the present invention.

FIG. 2 illustrates a diagram of an RLC Tr mode structure, according to the present invention. RLC of a data transmission device in a wireless communication system has a transparent entity structure. The data transmission device having the transparent entity structure stores service data units in a transmission data storage module and segments the service data units so as to divide the service data units into at least one protocol data unit.

A MAC layer as a lower layer of an RLC layer provides the RLC layer of the data transmission device with information about a size and number of the protocol data units. In accordance with a demand of the MAC layer, the data transmission device segments the service data units into at least one protocol data unit having a size corresponding to the demand and then transmits the demanded number of protocol data units to the MAC layer.

A data transmission device 201 in a wireless communication system having the RLC layer, as shown in FIG. 2, includes a transmission buffer 202 as a transmission data storage module, which stores service data units transmitted from a higher layer. A segmentation module 204 segments the service data units into protocol data units having a demanded size and number of units, depending on a demand signal from a lower layer such as a MAC layer. Then, the segmentation module 204 transmits the at least one protocol data unit to the MAC layer 203.

A process for transmitting data in a wireless data transmission device having a transparent mode RLC layer according to the present invention is explained in detail below.

The transparent mode RLC layer 201 of the wireless data transmission device based on a radio interface 200, as shown in FIG. 2, stores the service data units coming down from the higher layer in the transmission buffer 202. The MAC 203 transfers the information about the number and size of protocol data units, which will be transmitted to the MAC 203, to the transparent mode RLC layer 201 through MAC status indication information (MAC-STATUS-IND primitive). The segmentation module 204 of the transparent mode RLC layer (or RLC Tr entity) 201 segments the service data units into proper protocol data units, without attaching an overhead thereto, in accordance with a size (PDU size) of the protocol data units demanded by the MAC 203. A method of carrying out the segmentation depends on when the service is established.

When the RLC service data units are segmented, an allowable size for the RLC PDU depends on the transport formats of a transport channel. Preferably, the size of the RLC PDU is decided in a manner such that the number of RLC PDUs multiplied by the RLC PDU size is the size of the RLC SDU.

All of the RLC PDUs carrying a single RLC SDU are transferred in one transmission time interval. Moreover, only the segments of one RLC SDU are transferred in one transmission time interval, while the segments of the other RLC SDUs are not transmitted in that transmission time interval.

If the segmentation process is not used for the Tr mode RLC layer, more than one RLC SDU can be sent in a single transmission time interval using one RLC PDU for each RLC SDU. The RLC PDUs should have the same size in this case, due to the limitations of the lower layer.

The Tr mode RLC layer 201 transmits the PDUs to the MAC 203 in each determined transmission time interval (TTI). The PDUs are transmitted to the MAC with the proper number and size in response to the amount of the PDUs demanded by the MAC 203.

As mentioned in the foregoing explanation, the MAC 203 transfers the information about the number and size of protocol data units, which will be transmitted to the transparent (Tr) mode RLC layer 201 through the MAC status indication information (MAC-STATUS-IND) primitive.

The RLC layer 201, which has received the information about the number and size of protocol data units from the MAC 203 with respect to every TTI, turns the SDU stored in the transmission buffer 202 into at least one PDU having the size demanded by the MAC layer 203 and then transmits the demanded number of PDUs to the MAC 203.

The PDUs are transmitted to a data receiver device 205 having the Tr mode RLC layer based on the radio interface 200. An RLC layer 205 of the data receiver device stores the PDUs, which are received from the MAC layer through one of the logical channels BCCH, CCCH, DCCH, PCCH, SHCCH, and DTCH based on the radio interface 200, in a receiver buffer 206.

Subsequently, the RLC layer 205 of the data receiver device, when having received all the PDUs constructing one complete SDU, sends up the received data to the higher layer by SDU unit through a transparent SAP (Tr-SAP). More specifically, the PDUs stored in the receiver buffer 206 are reassembled as an RLC SDU unit in a reassembly module 207 and then transmitted to the higher layer through the transparent SAP (Tr-SAP). The reassembly step is only carried out when the SDUs are segmented into the PDUs in the data transmission device. How the reassembly step is carried out depends on when the service is established.

Compared to the related art, the present invention is characterized in that non-segmented SDUs are stored in the transmission buffer 202 and that the MAC 203 informs the RLC layer 201 of the size of the PDU as well as the number of the demanded PDUs, when demanding PDUs from the RLC layer 201. Also, the transmission buffer 202 processes data units not by the PDU unit but by the SDU unit.

Figure 3:
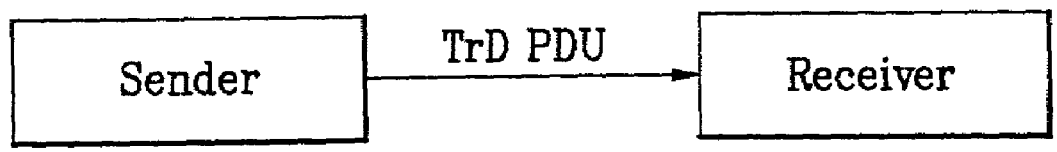
FIG. 3 illustrates a diagram for explaining procedures of processing transparent mode data between two wireless communication systems having Tr mode RLC layers.

FIG. 3 illustrates a diagram for explaining procedures of transmitting transparent mode data between two peer entities having Tr mode RLC layers. The process of transmitting Tr mode data is used for transmitting data between two RLC peer entities operated by the Tr mode. In FIG. 3, a sender may be a user entity (UE) or a network and a receiver may be the network or UE.

The sender initiates this process if the Tr mode data are requested by the higher layer. The sender converts the service data unit received from the higher layer into PDUs of Tr mode on a data transfer ready state. If requested, the sender will convert the SDUs received from the higher layer into the PDUs.

Available logical channels are DTCH, CCCH (up-link), SHCCH (up-link), BCCH, and PCCH. Types of the logical channels depend on whether the RLC layer of the sender is located at a user plane DTCH or a control plane CCCH/BCCH/SHCCH/PCCH.

More than one PDU can be transmitted in each transmission time interval. MAC, as a lower layer of the sender, decides what PDU size will be used as well as how many PDUs will be transmitted in each of the transmission time intervals.

The Tr mode PDUs may be one complete SDU or segments of an SDU. How the segmentation is carried out, as mentioned in the foregoing explanation, depends on when the service is established. No overhead or header is added to the PDUs. Instead, the segmentation is carried out in accordance with what kind of a transport channel and its transport format are used. A specific transport format informs the receiver of how the segmentation was carried out.

When the Tr mode PDUs are received, the receiver reassembles the received PDUs into the RLC SDUs, if the SDUs are segmented. The RLC layer of the receiver then transfers the RLC SDUs to the higher layer through the transparent SAP.

Accordingly, the present invention provides the following effects or advantages.

A data transmission apparatus having a TR mode RLC layer according to the present invention stores the service data units transferred from the higher layer in the transmission buffer and then segments the stored service data units into one or more protocol data units having the demanded number and size variably determined in accordance with the information from the lower layer MAC.

Therefore, the present invention provides an efficient transmission of PDUs. Moreover, the present invention provides a smooth transmission of voice data having a variable length, as well as packet data having a uniform length.

Besides, the RLC layer of the transmission apparatus segments the SDU into PDUs having the demanded number and size in accordance with the information from the MAC. Therefore, the MAC provides efficient multiplexing of the PDUs coming down from various RLC layers and further improves the performance of data transmission.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A communication device having a plurality of protocol layers including a radio link control (RLC) layer and medium access control (MAC) layer, the RLC layer comprising:

a transmission buffer storing at least one service data unit of the RLC layer (RLC SDU) transferred from an upper layer; and a segmentation module segmenting the at least one RLC SDU received from the transmission buffer into at least one protocol data unit of the RLC layer (RLC PDU) according to size information transferred from the MAC layer to the RLC layer, wherein the MAC layer is a lower layer of the RLC layer.

2. The communication device of claim 1, wherein a RLC transparent mode entity of the RLC layer transfers to the MAC layer at least one RLC PDU amounting to a number requested by the MAC layer.

3. The communication device of claim 2, wherein the RLC transparent mode entity receives the size and number information through a MAC-STATUS-Ind primitive from the MAC layer.

4. The communication device of claim 2, wherein the at least one RLC PDU is transferred to the MAC layer through a logical channel.

5. The communication device of claim 4, wherein the logical channel is any one of a dedicated control channel (DCCH), a dedicated traffic channel (DTCH), a common control channel (CCCH), a shared common control channel (SHCCH), a broadcast control channel (BCCH), and a paging control channel (PCCH).

6. The communication device of claim 4, wherein the at least one RLC PDU is sent to a peer entity of a receiver side.

7. The communication device of claim 2, wherein the RLC transparent mode entity transfers the at least one RLC PDU to the MAC layer in each transmission time interval (TTI).

8. The communication device of claim 7, wherein all RLC PDUs segmented from a RLC SDU are transferred to the MAC layer in a transmission time interval (TTI).

9. The communication device of claim 1, wherein the transmission buffer receives the at least one RLC SDU through a transparent mode service access point.

10. The communication device of claim 1, wherein the at least one RLC SDU is segmented by the segmentation module depending upon when a service is established.

11. The communication device of claim 1, wherein an allowable size for the at least one RLC PDU is decided based on transmit formats of a transport channel.

12. The communication device of claim 1, wherein the at least one RLC PDU provided by the segmentation module comprises one complete RLC SDU or segments of one complete RLC SDU.

13. The communication device of claim 1, further comprising:
    a receiver buffer storing at least one RLC PDU received from the MAC layer; and
    a reassembly module reassembling the at least one RLC PDU received from the receiver buffer into at least one RLC SDU.

14. A data processing method in a wireless communication device having a plurality of protocol layers including a radio link control (RLC) layer and a medium access control (MAC) layer, the method, comprising:
    storing at least one service data unit of the RLC layer (RLC SDU) transferred from an upper layer in a transmission buffer;
    segmenting the at least one RLC SDU received from the transmission buffer into at least one protocol data unit of the RLC layer (RLC PDU) according to size information transferred from the MAC layer to the RLC layer, wherein the MAC layer is a lower layer of the RLC layer; and
    providing the at least one RLC PDU to the MAC layer.

15. The method of claim 14, wherein the RLC layer provides to the MAC layer RLC PDUs amounting to a number requested by the MAC layer.

16. The method of claim 14, wherein the RLC layer receives the size and number information through a MAC-STATUS-Ind primitive from the MAC layer.

17. The method of claim 14, wherein the at least one RLC PDU is provided to the MAC layer through a logical channel.

18. The method of claim 17, wherein the logical channel is any one of a dedicated control channel (DCCH), a dedicated traffic channel (DTCH), a common control channel (CCCH), a shared common control channel (SHCCH), a broadcast control channel (BCCH), and a paging control channel (PCCH).

19. The method of claim 14, wherein the transmission buffer receives the at least one RLC SDU through a transparent mode service access point.

20. The method of claim 14, wherein the at least one RLC SDU of the transmission buffer is segmented by a segmentation module to provide the at least one RLC PDU depending upon when a service is established.

21. The method of claim 14, wherein an allowable size for the at least one RLC PDU is decided based on transmit formats of a transport channel.

22. The method of claim 14, wherein the at least one RLC PDU provided by the segmentation module comprises one complete RLC SDU or segments of one complete RLC SDU.

23. The method of claim 14, wherein the at least one RLC PDU is transferred to the MAC layer in each transmission time interval (TTI).

24. The method of claim 23, wherein all RLC PDUs segmented from a RLC SDU are transferred to the MAC layer in a transmission time interval (TTI).

* * * * *